US008561522B2

(12) United States Patent
Funato et al.

(10) Patent No.: US 8,561,522 B2
(45) Date of Patent: Oct. 22, 2013

(54) HYDRAULIC CYLINDER

(75) Inventors: Hiroshi Funato, Gifu (JP); Takahiko Hara, Kani (JP)

(73) Assignee: Kayaba Industry Co., Ltd., Tokyo (JP)

( * ) Notice: Subject to any disclaimer, the term of this patent is extended or adjusted under 35 U.S.C. 154(b) by 575 days.

(21) Appl. No.: 12/993,353

(22) PCT Filed: Jan. 5, 2010

(86) PCT No.: PCT/JP2010/050188

§ 371 (c)(1),
(2), (4) Date: Nov. 18, 2010

(87) PCT Pub. No.: WO2010/082550

PCT Pub. Date: Jul. 22, 2010

(65) Prior Publication Data

US 2011/0067564 A1 Mar. 24, 2011

(30) Foreign Application Priority Data

Jan. 13, 2009 (JP) ................................ 2009-004385

(51) Int. Cl.
*F16J 1/12* (2006.01)

(52) U.S. Cl.
USPC .............................................. 92/179; 92/255

(58) Field of Classification Search
USPC .................................................. 92/179, 255
See application file for complete search history.

(56) References Cited

U.S. PATENT DOCUMENTS

| | | | | |
|---|---|---|---|---|
| 3,885,461 | A | 5/1975 | Crisp et al. | |
| 3,994,604 | A * | 11/1976 | Visser | 92/255 |
| 4,089,253 | A * | 5/1978 | Visser | 92/179 |
| 4,863,323 | A | 9/1989 | Glaser | |
| 7,513,191 | B2 * | 4/2009 | Kim et al. | 92/179 |
| 8,122,812 | B2 * | 2/2012 | Herwig | 92/255 |

FOREIGN PATENT DOCUMENTS

| | | | |
|---|---|---|---|
| JP | 50-72083 | A | 6/1975 |
| JP | 61-58708 | U | 4/1986 |
| JP | 03-67702 | U | 7/1991 |
| JP | 3-80107 | U | 8/1991 |
| JP | 09-303319 | A | 11/1997 |
| JP | 11-230117 | | 8/1999 |
| JP | 11-336894 | | 12/1999 |
| JP | 2003-294013 | A | 10/2003 |
| KR | 97-18607 | | 5/1997 |

* cited by examiner

*Primary Examiner* — Michael Leslie
(74) *Attorney, Agent, or Firm* — Rabin & Berdo, P.C.

(57) ABSTRACT

A hydraulic cylinder includes a piston unit inside a cylinder to be free to slide within the cylinder; and a piston rod having the piston unit fixed to one end thereof and another end thereof projecting from the cylinder. The piston unit is inserted into a small diameter portion of the piston rod with an end surface thereof fixedly contacting a shoulder end surface of the piston rod. A round portion is formed as an annular concave in a base end portion outer periphery of the small diameter portion of the piston rod. A tapered portion is formed on an inner periphery of the piston unit from the end surface in alignment with a portion formed by concaving the small diameter portion. A length of the tapered portion in a piston unit axial direction is equal or greater than a length of the concave portion in a piston rod axial direction.

2 Claims, 5 Drawing Sheets

HYDRAULIC CYLINDER

TECHNICAL FIELD

This invention relates to a hydraulic cylinder that expands and contracts in accordance with supply and discharge of a working fluid.

BACKGROUND ART

JPH11-230117A discloses a conventional hydraulic cylinder in which a piston rod is inserted into a cylinder tube to be free to move via a piston.

The piston is inserted into a spigot portion on a piston rod tip end, and a nut is fastened to the spigot portion. Thus, an end surface of the piston is pressed fixedly against a step portion of the piston rod.

SUMMARY OF INVENTION

A fastening force of the piston relative to the piston rod must be set at or above a thrust generated by a fluid pressure acting on the piston. Therefore, the piston must be fastened to the piston rod with a large load, and depending on the magnitude of the load, the piston may be compressively deformed between the piston rod and the nut such that a piston inner periphery and a piston rod outer periphery are adhered to each other.

If the piston is adhered to the piston rod when the hydraulic cylinder is disassembled for an inspection, the piston cannot be dislodged from the piston rod, making disassembly and inspection impossible.

This invention has been designed in consideration of the problem described above, and an object thereof is to provide a hydraulic cylinder that can be disassembled while securing sufficient fastening force to fasten a piston to a piston rod.

This invention is a hydraulic cylinder that expands and contracts in accordance with supply and discharge of a working fluid. The hydraulic cylinder comprises a piston unit that is defined in an interior of a cylinder tube to be free to perform a sliding motion within the cylinder tube, and a piston rod in which the piston unit is fixed to one end thereof and the other end thereof projects from the cylinder tube, wherein the piston unit is inserted into a small diameter portion of the piston rod such that an end surface thereof fixedly contacts a shoulder end surface of the piston rod, a round portion is formed as an annular concave in a base end portion outer periphery of the small diameter portion of the piston rod, a tapered portion is formed on an inner periphery of the piston unit from the end surface in alignment with an concave portion formed by concaving the small diameter portion, and a length of the tapered portion in a piston unit axial direction is equal to or greater than a length of the concave portion in a piston rod axial direction.

According to this invention, the round portion is formed as the annular concave in the base end portion outer periphery of the small diameter portion of the piston rod, and therefore a sectional area by which the piston unit contacts the shoulder end surface of the piston rod can be increased such that a sufficient fastening force for fastening the piston unit to the piston rod can be secured. Further, the tapered portion is formed on the inner periphery of the piston unit from the end surface in alignment with the concave portion, and therefore, even if the piston unit is compressively deformed, the inner periphery of the piston unit is prevented from entering the concave portion. As a result, a situation in which the piston unit cannot be dislodged from the piston rod does not occur.

Hence, the hydraulic cylinder that can be disassembled while securing sufficient fastening force to fasten the piston unit to the piston rod can be obtained.

MODES FOR CARRYING OUT THE INVENTION

Embodiments of this invention will be described below with reference to the figures.

In these embodiments, cases in which the hydraulic cylinder is a hydraulic cylinder that expands and contracts in accordance with supply and discharge of a working oil (working fluid) will be described.

First Embodiment

Figure 1:
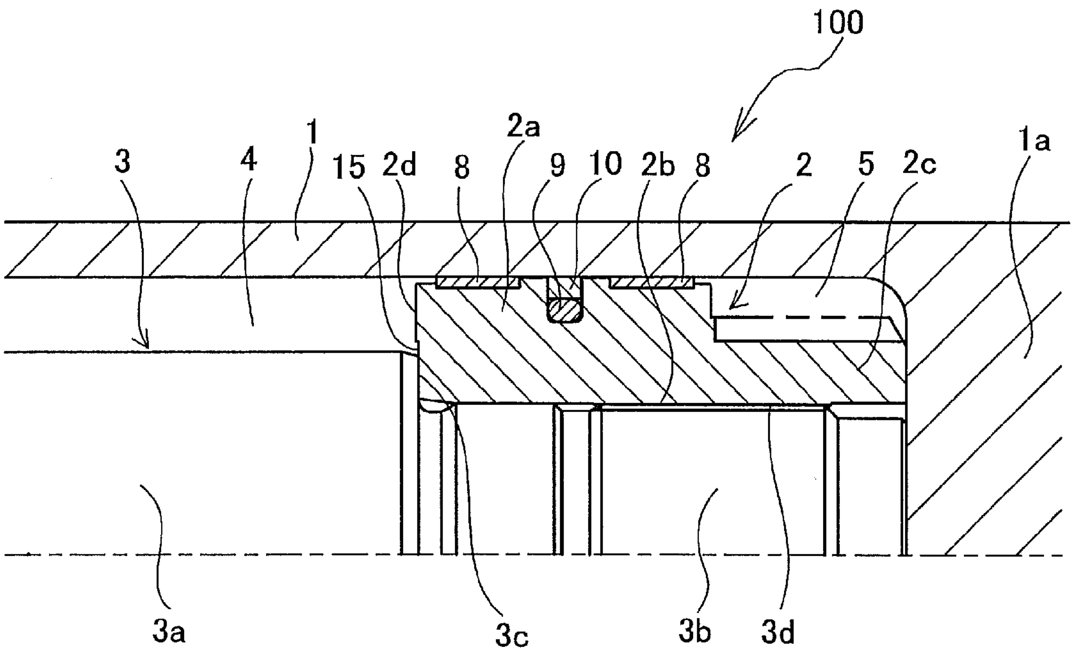
FIG. 1 is a partial sectional view showing a hydraulic cylinder according to a first embodiment of this invention.

Referring to FIG. 1, a hydraulic cylinder 100 according to a first embodiment of this invention will be described. FIG. 1 is a partial sectional view of the hydraulic cylinder 100.

The hydraulic cylinder 100 is used as an actuator in a construction machine or another industrial machine.

The hydraulic cylinder 100 comprises a cylinder tube 1 to and from which the working oil is supplied and discharged, a piston unit 2 which is capable of performing a free sliding motion within the cylinder tube 1, and a piston rod 3 in which the piston unit 2 is fixed to one end thereof and the other end thereof projects from the cylinder tube 1.

The cylinder tube 1 is a closed-end tubular member having a bottom portion 1*a*, the interior of which is divided by the piston unit 2 into a rod side oil chamber 4 and an anti-rod side oil chamber 5. A cylinder head (not shown) is provided in an opening portion at an end portion of the cylinder tube 1, thereby closing the opening portion.

The working oil is supplied to and discharged from the rod side oil chamber 4 and the anti-rod side oil chamber 5 through ports (not shown), and in accordance with this supply and discharge, the piston unit 2 moves through the cylinder tube 1. More specifically, a flow of the working oil is controlled such that when working oil is supplied to one of the rod side oil chamber 4 and the anti-rod side oil chamber 5 from an oil pressure supply source, working oil is discharged from the other.

The piston unit 2 includes a cylindrical piston main body 2*a* that slides along an inner periphery of the cylinder tube 1, a female screw portion 2*b* that is formed in an inner periphery of the piston unit 2 and fastened to the piston rod 3, and an annular nut portion 2*c* that is formed integrally with the piston main body 2*a* to define a fastening force for fastening the piston main body 2*a* to the piston rod 3. Thus, the piston unit 2 has an integral nut structure in which the piston main body 2*a* and the nut are formed integrally. The piston unit 2 is a component including the piston main body 2*a* that slides along the inner periphery of the cylinder tube 1 and members associated therewith.

The piston main body 2*a* slides along the inner periphery of the cylinder tube 1 via a bearing 8 provided on an outer periphery thereof. Further, a seal 10 compressed against the inner periphery of the cylinder tube 1 by an O ring 9 is provided on the outer periphery of the piston main body 2*a*. The seal 10 forms a seal between the inner periphery of the cylinder tube 1 and the outer periphery of the piston main body 2*a* to prevent the working oil from passing between the rod side oil chamber 4 and the anti-rod side oil chamber 5.

The nut portion 2*c* is formed such that a tool can be attached to an outer periphery thereof. More specifically, the outer periphery of the nut portion 2*c* is formed to be hexagonal.

The piston rod 3 moves within the cylinder tube 1 together with the piston unit 2 fixed to one end thereof, thereby driving a load (not shown) fixed to the other end thereof outside the cylinder tube 1. Hence, the load fixed to the piston rod 3 is driven using thrust generated by oil pressure acting on the piston unit 2.

The piston rod 3 includes a main body portion 3*a*, and a small diameter portion 3*b* having a smaller diameter than the main body portion 3*a*, to which the piston unit 2 is fixed. A step portion is formed on a boundary between the main body portion 3*a* and the small diameter portion 3*b*, and a flat shoulder end portion 3*c* is formed on the piston rod 3 in a radial direction by the step portion. A male screw portion 3*d* which is screwed into the female screw portion 2*b* of the piston unit 2 is formed on the small diameter portion 3*b*.

Figure 2:
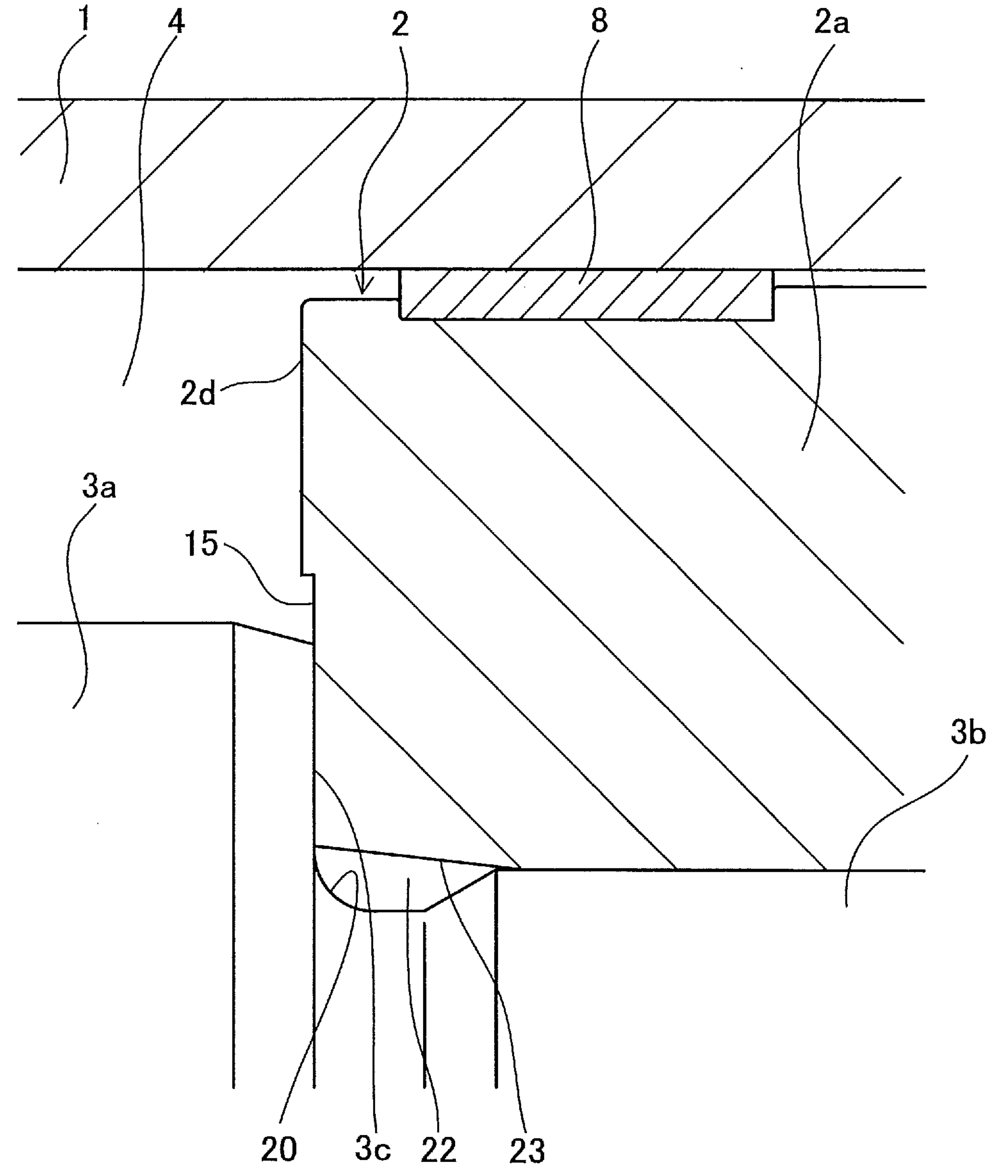
FIG. 2 is an enlarged view of the principal parts of the hydraulic cylinder according to the first embodiment of this invention.

To fix the piston unit 2 to the piston rod 3, first, the piston unit 2 is inserted into the small diameter portion 3*b* of the piston rod 3, whereupon the female screw portion 2*b* is screwed to the male screw portion 3*b* on the small diameter portion 3*b* such that an end surface 2*d* of the piston main body 2*a* contacts the shoulder end surface 3*c* of the piston rod 3 (the state shown in FIGS. 1 and 2). Thus, the piston unit 2 is fastened to the piston rod 3.

Here, a fastening force of the piston unit 2 relative to the piston rod 3 must be set at or above the thrust generated by the oil pressure acting on the piston unit 2 to ensure that the piston unit 2 does not fall out.

For this purpose, next, a tool is attached to the nut portion 2*c* of the piston unit 2, whereupon the piston unit 2 is rotated via the tool such that the end surface 2*d* of the piston main body 2*a* is pressed against the shoulder end surface 3*c* of the piston rod 3 with a load that equals or exceeds the thrust generated by the oil pressure. As a result, the piston unit 2 is fixed to the piston rod 3 with a fastening force that is equal to or greater than the thrust generated by the oil pressure.

When the piston unit 2 is fixed to the piston rod 3, the end surface 2*d* of the piston main body 2*a* comes into contact with the shoulder end surface 3*c* of the piston rod 3, and therefore the piston main body 2*a* and the piston rod 3 are sealed. Accordingly, the end surface 2*d* of the piston main body 2*a* functions to seal the piston main body 2*a* and the piston rod 3.

Here, since the piston unit 2 has the integral nut structure, the nut portion 2*c* must be fashioned on the outer periphery as well as fashioning the female screw portion 2*b* on the inner periphery, in contrast to a normal piston. In a case where the piston unit 2 must be placed on a workbench with the end surface 2*d* facing downward to fashion the female screw portion 2*b* and the nut portion 2*c* or to attach the bearing 8, the O ring 9, and the seal 10 to the outer periphery of the piston main body 2*a*, the end surface 2*d* having a sealing function may be damaged. Since the weight of the piston unit 2 having the integral nut structure is great, the end surface 2*d* is particularly likely to be damaged.

However, an annular indented step surface 15 is formed on the end surface 2*d* of the piston main body 2*a*. The step surface 15 has an inner diameter that matches an inner diameter of the piston main body 2*a* and an outer diameter that is larger than an outer diameter of the main body portion 3*a* of the piston rod 3. Hence, in a state where the piston unit 2 is fixed to the piston rod 3, the step surface 15 of the end surface 2*d* contacts the shoulder end surface 3*c* of the piston rod 3. Therefore, it is the step surface 15 of the end surface 2*d* that exhibits the sealing function.

The step surface 15 is indented from the end surface 2*d* of the piston main body 2*a*, and therefore, even when the piston unit 2 is placed on a workbench with the end surface 2*d* facing downward, the step surface 15 does not contact the workbench. Hence, damage to the step surface 15 can be prevented during fashioning of the piston unit 2 and so on. As a result, a favorable sealing characteristic can be obtained between the piston main body 2*a* and the piston rod 3.

Figure 3:
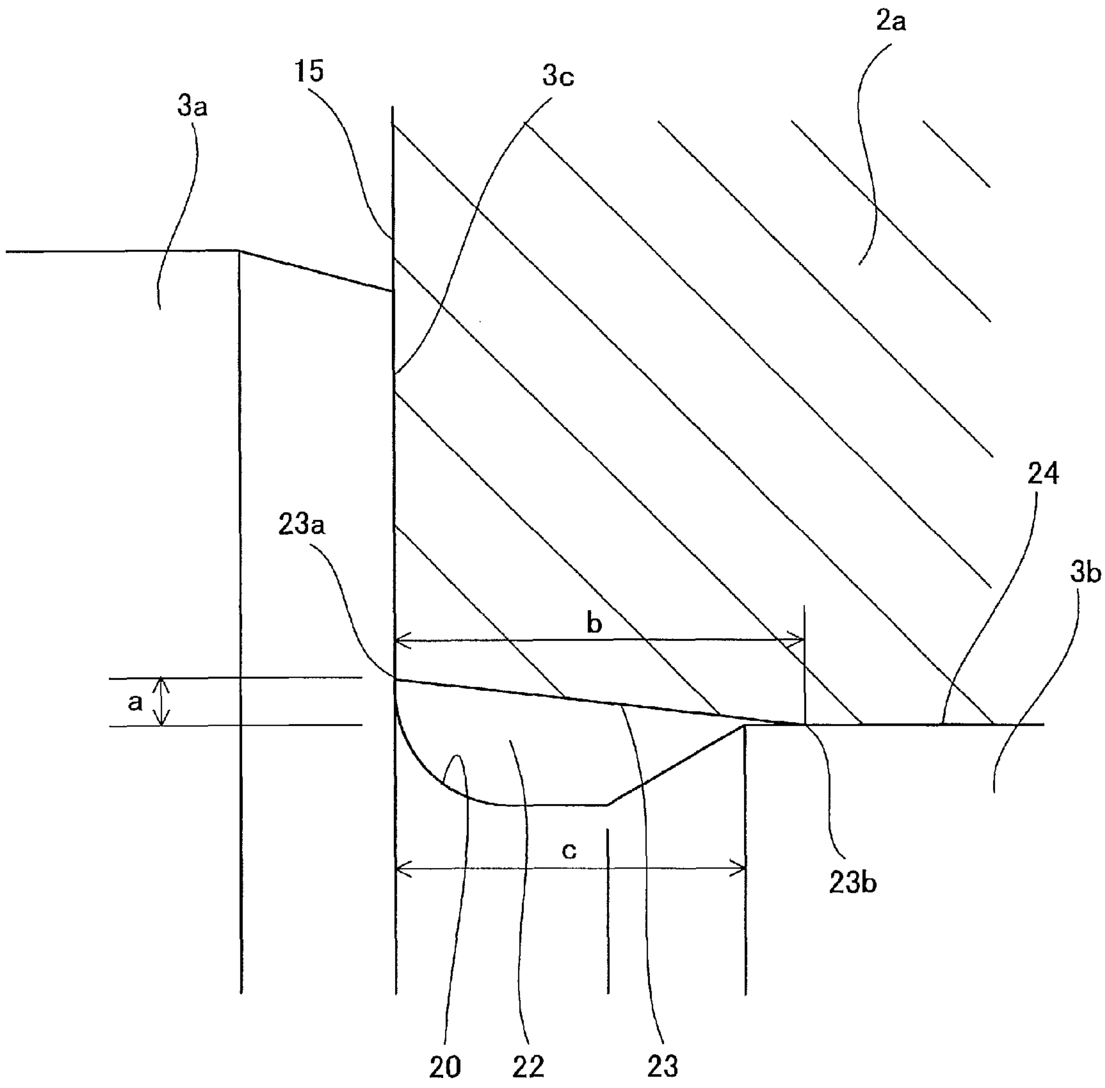
FIG. 3 is an enlarged view of FIG. 2.

Next, referring to FIGS. 2 and 3, the piston unit 2 and the piston rod 3 will be described. FIG. 2 is an enlarged view of the principal parts of the hydraulic cylinder 100. FIG. 3 is an enlarged view of FIG. 2.

Figure 4:
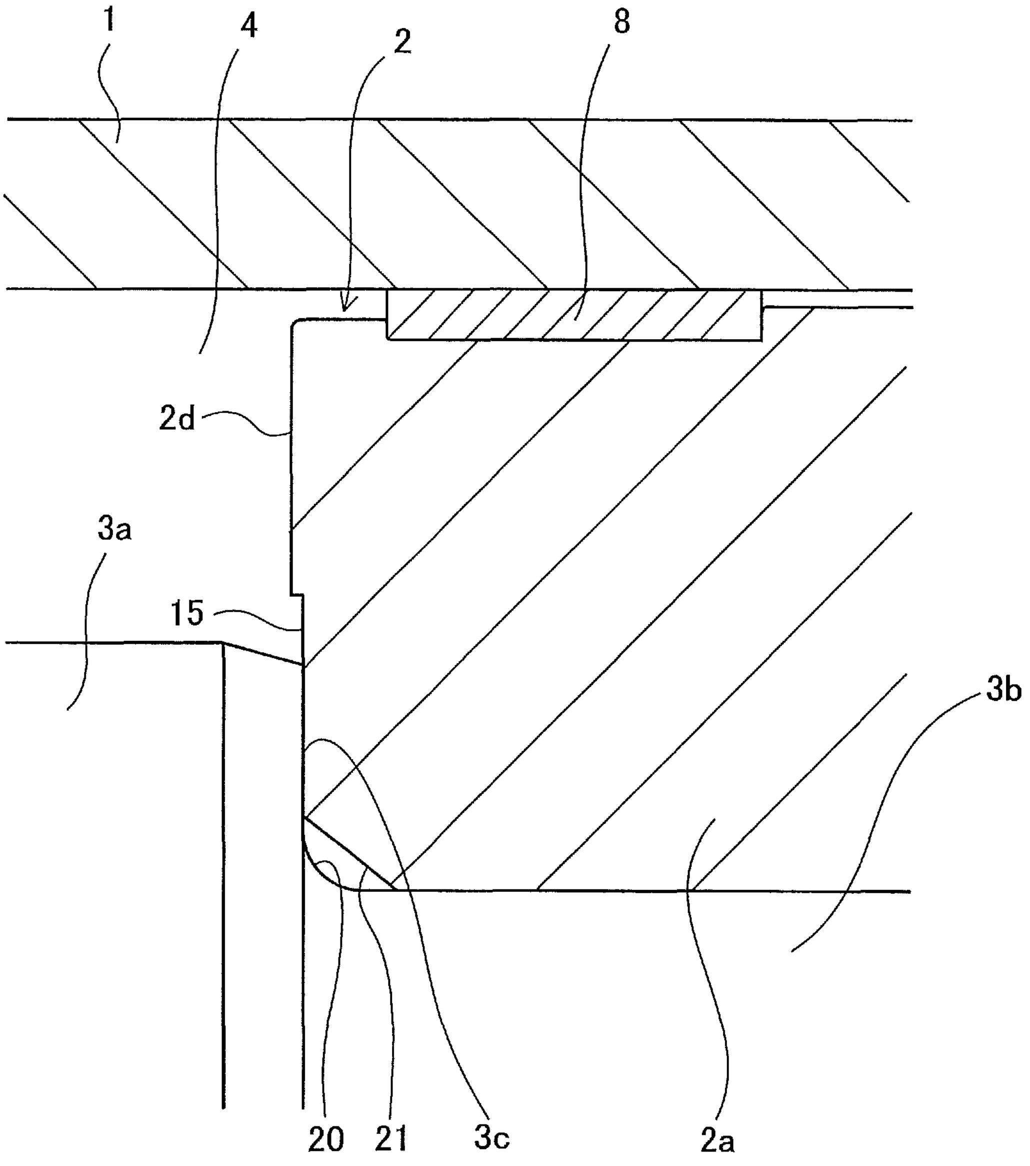
FIG. 4 is a view showing a comparative example of the hydraulic cylinder according to the embodiment of this invention.

First, referring to FIG. 4, a comparative example relating to this embodiment will be described. FIG. 4 is a view showing a comparative example of the hydraulic cylinder 100 according to this embodiment of the invention.

An annular round portion 20 is formed on an outer periphery of a base end portion serving as the base of the small diameter portion 3*b* to prevent stress concentration on an outer peripheral surface of the small diameter portion 3*b*.

As noted above, the fastening force of the piston unit 2 relative to the piston rod 3 must be set at or above the thrust generated by the oil pressure acting on the piston unit 2. Accordingly, the piston unit 2 must be fastened to the piston rod 3 with a large load, and therefore a surface area by which the piston main body 2*a* contacts the shoulder end surface 3*c* of the piston rod 3 is preferably as large as possible. Meanwhile, a chamfered portion 21 is formed in a corner portion on an inner peripheral end portion of the piston main body 2*a* to prevent stress concentration on the shoulder end surface 3*c* of the piston rod 3. When a dimension of the chamfered portion 21 is large, the surface area by which the piston main body 2*a* contacts the shoulder end surface 3*c* of the piston rod 3 decreases, and therefore the dimension of the chamfered portion 21 is preferably as small as possible. However, the round portion 20 is formed on the base end portion outer periphery of the small diameter portion 3*b*, and therefore the dimension of the chamfered portion 21 must be increased in accordance with the dimension of the round portion 20, leading to a reduction in the surface area by which the piston main body 2*a* contacts the shoulder end surface 3*c* of the piston rod 3.

Hence, in the hydraulic cylinder 100 according to this embodiment, as shown in FIG. 2, the round portion 20 is formed as an annular concave in the base end portion outer periphery of the small diameter portion 3*b*. In so doing, an annular concaved concave portion 22 is formed in the base end portion outer periphery of the small diameter portion 3*b*. By forming the round portion 20 concavely, the dimension of the chamfered portion formed on the inner peripheral end portion of the piston main body 2*a* can be made as small as possible, and as a result, the surface area by which the piston main body 2*a* contacts the shoulder end surface 3*c* of the piston rod 3 can be increased.

However, when the fastening force of the piston unit 2 relative to the piston rod 3 is large, the piston unit 2 may be compressively deformed, and in this case, the inner periphery of the piston main body 2*a* enters the concave portion 22. If the inner periphery of the piston main body 2*a* enters the concave portion 22, the piston unit 2 cannot be dislodged from the piston rod 3 during disassembly of the piston unit 2 and piston rod 3.

In response to this problem, an annular tapered portion 23 is formed on the inner periphery of the piston main body 2*a* from the step surface 15 in alignment with the concave portion 22. As a result, the inner periphery of the piston main body 2*a* opposing the concave portion 22 is tapered such that an inner diameter thereof increases, and therefore the inner periphery of the piston main body 2*a* is prevented from entering the concave portion 22 even if the piston unit 2 is compressively deformed. Hence, a situation in which the piston unit 2 cannot be dislodged from the piston rod 3 does not occur.

Referring to FIG. 3, the tapered portion 23 will be described in detail.

The tapered portion 23 is formed to decrease gradually in diameter from a maximum inner diameter portion 23*a* at one end to a minimum inner diameter portion 23*b* at the other end.

The maximum inner diameter portion 23*a* of the tapered portion 23 is formed to contact the shoulder end surface 3*c* of the piston rod 3. By forming the tapered portion 23 to extend from the step surface 15 while decreasing in diameter in this manner, the corner portion on the inner peripheral end portion of the piston main body 2*a* is chamfered, and therefore the tapered portion 23 functions to prevent stress concentration on the shoulder end surface 3*c* of the piston rod 3.

The corner portion on the inner peripheral end portion of the piston main body 2*a* is chamfered by a dimension difference a between the maximum inner diameter portion 23*a* and the minimum inner diameter portion 23*b*. The round portion 20 is formed concavely in the base end portion inner periphery of the small diameter portion 3*b*, and therefore the dimension a can be made as small as possible. More specifically, the dimension a can be set such that stress does not concentrate on the shoulder end surface 3*c* of the piston rod 3.

Further, the tapered portion 23 is formed such that a length b thereof in a piston unit axial direction is equal to or greater than a length c of the concave portion 22 in a piston rod axial direction. In other words, as shown in FIG. 3, the minimum inner diameter portion 23*b* of the tapered portion 23 faces a non-concaved outer peripheral surface 24 rather than the concave portion 22 of the small diameter portion 3*b*. Hence, the entire inner periphery of the piston main body 2*a* corresponding to the concave portion 22 is formed in a tapered shape, and as a result, the inner periphery of the piston main body 2*a* is prevented from entering the concave portion 22 even when the piston unit 2 is compressively deformed.

According to the embodiment described above, the following actions and effects are obtained.

The round portion 20 is formed as an annular concave in the base end portion outer periphery of the small diameter portion 3*b* of the piston rod 3, and therefore the surface area by which the piston main body 2*a* contacts the shoulder end surface 3*c* of the piston rod 3 can be increased such that sufficient fastening force for fastening the piston unit 2 to the piston rod 3 can be secured. Further, the tapered portion 23 is formed on the inner periphery of the piston main body 2*a* in alignment with the concave portion 22, and therefore the inner periphery of the piston main body 2*a* is prevented from entering the concave portion 22 even when the piston unit 2 is compressively deformed. As a result, a situation in which the piston unit 2 cannot be dislodged from the piston rod 3 does not occur. Hence, a hydraulic cylinder 100 that can be disassembled while securing sufficient fastening force to fasten the piston unit 2 to the piston rod 3 can be obtained.

Furthermore, the annular indented step surface 15 is formed on the end surface 2*d* of the piston main body 2*a*, and therefore, when the piston is placed on a workbench with the end surface 2*d* facing downward, the step surface 15 does not contact the workbench. Hence, the step surface 15 that contacts the shoulder end surface 3*c* of the piston rod 3 can be prevented from becoming damaged, and as a result, a favorable sealing characteristic can be obtained between the piston main body 2*a* and the piston rod 3.

Second Embodiment

Figure 5A:
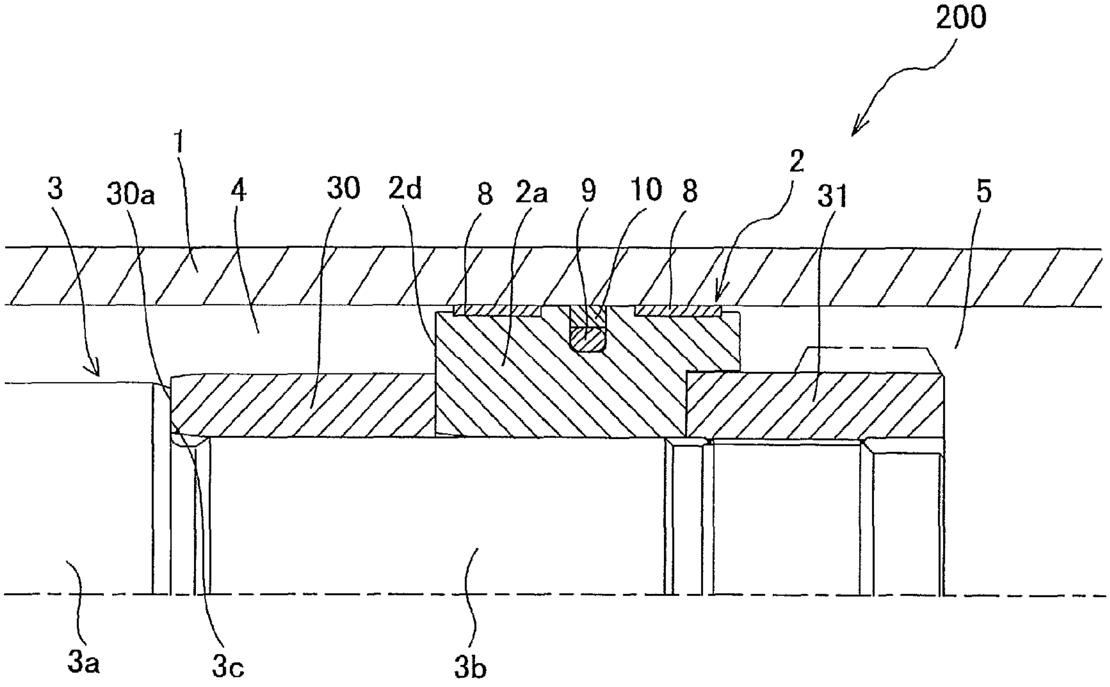
FIG. 5A is a partial sectional view showing a hydraulic cylinder according to a second embodiment of this invention.
Figure 5B:
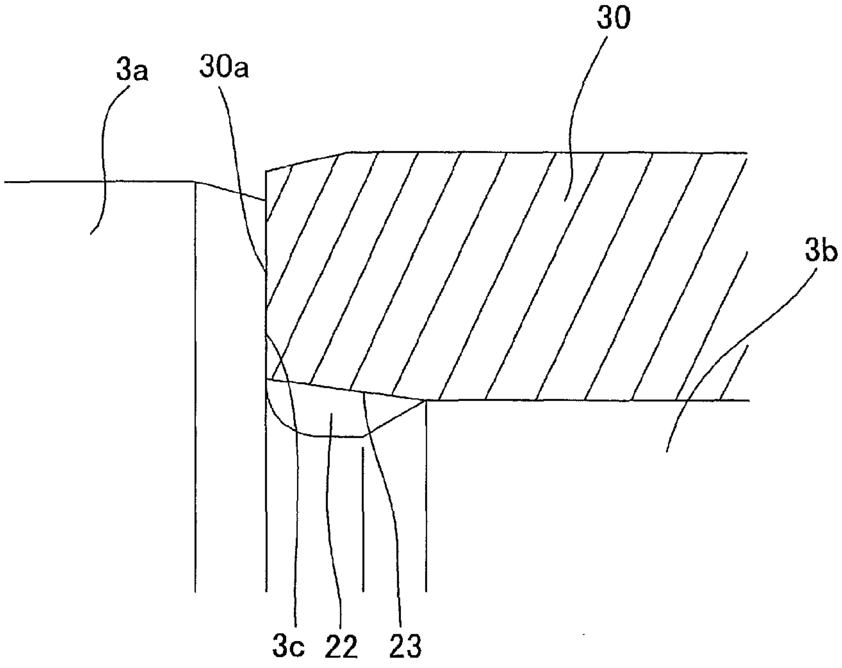
FIG. 5B is an enlarged view of the principal parts of the hydraulic cylinder according to the second embodiment of this invention.

Referring to FIG. 5, a hydraulic cylinder 200 according to a second embodiment of this invention will be described. FIG. 5A is a partial sectional view of the hydraulic cylinder 200, and FIG. 5B is an enlarged view of the principal parts of the hydraulic cylinder 200.

In the hydraulic cylinder 200 according to the second embodiment, identical constitutions to the hydraulic cylinder 100 according to the first embodiment described above have been allocated identical reference symbols, and description thereof has been omitted. The following description centers on differences with the first embodiment.

In the hydraulic cylinder 200, the piston unit 2 comprises the piston main body 2*a*, a nut 31 formed separately to the piston main body 2*a*, and an annular cushion bearing 30 (annular body) interposed between the shoulder end surface 3*c* of the piston rod 3 and the piston main body 2*a*. Hence, in the hydraulic cylinder 200, an end surface 30*a* of the cushion bearing 30 contacts the shoulder end surface 3*c* of the piston rod 3, rather than the end surface 2*d* of the piston main body 2*a*. In other words, the end surface 30*a* of the cushion bearing 30 functions to seal the cushion bearing 30 and the piston rod 3.

During maximum expansion of the hydraulic cylinder 200, the cushion bearing 30 throttles a flow passage sectional area of an annular port formed in an inner periphery of the cylinder head such that resistance is applied to a flow of working oil from the rod side oil chamber 4 to the port. Thus, the cushion bearing 30 functions to reduce an expansion speed of the hydraulic cylinder 200.

The tapered portion 23 is formed on an inner periphery of the cushion bearing 30 in alignment with the concave portion 22 formed in the base end portion outer periphery of the small diameter portion 3*b* of the piston rod 3.

The tapered portion 23 is shaped similarly to that of the first embodiment, i.e. such that the length thereof in the piston unit axial direction is equal to or greater than the length of the concave portion 22 in the piston rod axial direction.

The cushion bearing 30 is pressed against the shoulder end surface 3*c* of the piston rod 3 with a similar fastening force to the fastening force exerted on the piston main body 2*a* by the nut 31, and may therefore undergo compressive deformation. However, the tapered portion 23 is formed on the inner periphery of the cushion bearing 30 in alignment with the concave portion 22, and therefore, even if the cushion bearing 30 undergoes compressive deformation, the inner periphery of the cushion bearing 30 is prevented from entering the concave portion 22. As a result, a situation in which the cushion bearing 30 cannot be dislodged from the piston rod 3 does not occur.

According to this embodiment, as described above, a hydraulic cylinder 200 that can be disassembled while securing sufficient fastening force to fasten the piston main body 2*a* to the piston rod 3 can be obtained.

This invention is not limited to the embodiments described above, and may be subjected to various amendments and modifications within the scope of the technical spirit thereof, such amendments and modifications being included in the technical scope of this invention.

The contents of Japanese Patent Application No. 2009-4385 with a filing date of Jan. 13, 2009 in Japan are hereby incorporated by reference.

INDUSTRIAL APPLICABILITY

The hydraulic cylinder according to this invention may be used as an actuator that drives a load.

The invention claimed is:

1. A hydraulic cylinder that expands and contracts in accordance with supply and discharge of a working fluid, comprising:

a piston unit that is defined in an interior of a cylinder tube to be free to perform a sliding motion within the cylinder tube; and a piston rod in which the piston unit is fixed to one end thereof and the other end thereof projects from the cylinder tube, wherein the piston unit is disposed on a small diameter portion of the piston rod such that an end surface thereof fixedly contacts a shoulder end surface of the piston rod, a round concave is formed as an annular concave in a base end portion outer periphery of the small diameter portion of the piston rod, a tapered portion is formed on an inner periphery of the piston unit from the end surface in alignment with the annular concave portion formed by concaving the small diameter portion, and a length of the tapered portion in a piston unit axial direction is equal to or greater than a length of the concave portion in a piston rod axial direction.

2. The hydraulic cylinder as defined in claim 1, wherein the piston unit comprises:

a piston main body; and an annular body interposed between the piston main body and the shoulder end surface of the piston rod, wherein the tapered portion is formed on an inner periphery of the annular body.

* * * * *